Oct. 11, 1932.    B. FORD    1,882,414
STORAGE BATTERY
Filed Nov. 26, 1927
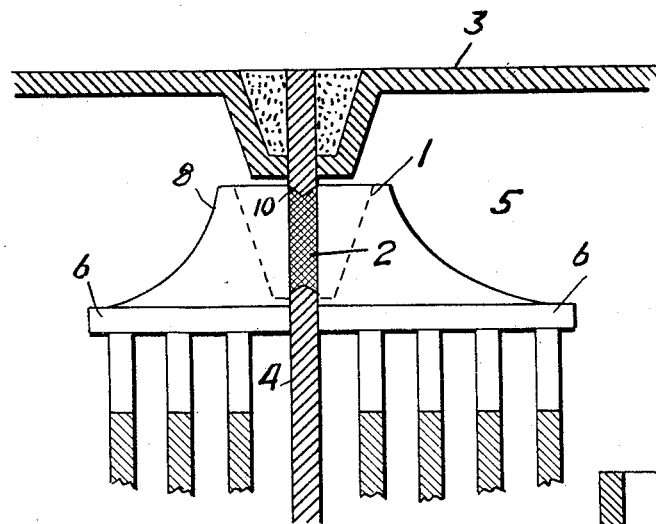
FIG.1.
FIG.3.
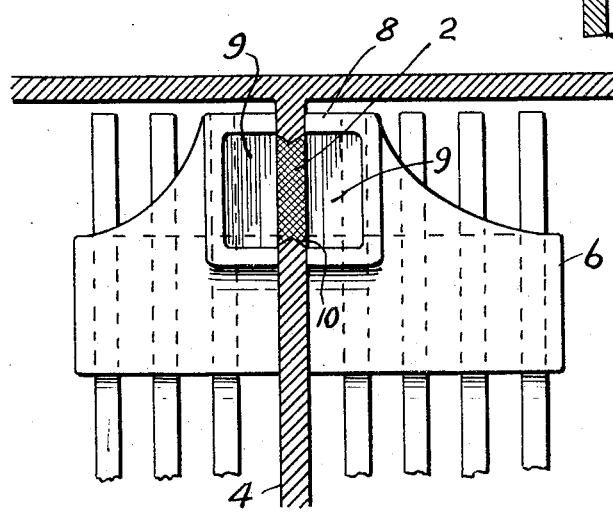
FIG.2.
WITNESS:
INVENTOR
Bruce Ford
BY
Augustus B. Stoughton.
ATTORNEY.

Patented Oct. 11, 1932

1,882,414

UNITED STATES PATENT OFFICE

BRUCE FORD, OF PHILADELPHIA, PENNSYLVANIA

STORAGE BATTERY

Application filed November 26, 1927. Serial No. 235,801.

The present application is a continuation in part of my application, Serial No. 54,866, filed September 8, 1925, for storage batteries. The application has matured to Patent No. 1,758,506, dated May 13, 1930.

Objects of the present invention are, first, to effect any economy in the construction and assembly, more especially in respect to the intercell connections; and second, to effect an economy in both labor and material.

Other objects of the invention will appear from the following description and the invention comprises the improvements to be presently described and finally claimed.

In the following description reference will be made to the accompanying drawing forming part hereof and in which Figure 1 is a sectional elevation of so much and of such parts of a storage battery as is necessary for illustrating features of the invention in application thereto.

Fig. 2 is a top or plan view of Fig. 1 showing the same with the cover or covers removed and with the cell walls in section, and Fig. 3 is a side view showing the opening provided in the cell wall for the passage of the connector in the form of a notch.

The intercell connection is indicated at 1 and 2 and it is housed inside of the cell cover or covers 3 and extends through an opening provided in the partition wall 4 between adjoining cells. It will of course be understood that the partition wall 4 is a part of a battery container of which the space generally indicated at 5 is a part of a covered cell. It may be remarked that the partition wall 4 is vertical when the battery is in normal position. 6 is a plate structure housed within the interior of the covered cell and above which there is the gas space 5. As shown the part 2 of the intercell connector is a conducting button mounted in the partition wall 4, and the part 1 of the intercell connector consists of conducting metal such as lead alloy. The terminal 8 of the plate structure and the part 2 of the connector are equipped with spaced confronting walls providing between them chambers 9, Fig. 2, of which the walls provide dams useful in installing the parts 1 of the connector by the use of fluid metal or lead alloy. It may be stated that the parts 1 and 2 and the terminal 8 are in effect continuous and the demarcation shown and above referred to is set forth for the sake of explanation. Between the wall of the button and the wall of the opening in which it is mounted there is a tongue and groove or double beveled joint 10, so that the button and the vertical partition wall are clamped together and the plate structure and connector are clamped to the partition wall and the terminals of the plate structure are disposed upon opposite faces of the partition wall and are in contact with those faces. The opening provided in the partition wall for the passage of the connector may be bounded by a continuous wall as shown in Figs. 1 and 2, or it may be in the form of a notch, as shown in Fig. 3, in which case the notch is filled with appropriate material, not shown in Fig. 3 for the sake of clearness, and adapted to provide substantial continuity of the partition wall. The button 2 may be primarily inserted in the manufacture of the container, or the opening provided in a vertical cell wall of its reception may be filled with conducting metal by pouring. The employment of the opening in the form of a notch and the filling of the opening with metal by pouring are original with this application.

The faces of the button 2 are substantially flush with the faces of the wall 4 to make the path for the current as short as possible, and to facilitate the insertion and removal of the plate structure of the cell.

I claim:

1. An intercell connector for storage batteries including in combination an intercell vertical wall, a metallic button located below the upper edge of the wall in an opening in said wall, plate structures on either side of said wall, terminals in said plate structures having cavities therein open at the top and at the side confronting said button, and metal in said cavities clamping said terminals against said wall on either side thereof due to the contraction of said metal upon cooling.

2. An intercell connector for storage batteries including in combination an intercell vertical wall having an opening therein whose bottom is below the upper edge of said wall, plate structures on either side of said wall, terminals on said plate structures having cavities therein open at the top and at the side confronting said opening, and metal in said cavities and and said opening clamping said terminals against said wall on either side thereof due to the internal strains in said metal.

BRUCE FORD.